May 29, 1951  J. B. WHITE  2,555,173
BALLAST SPREADER

Filed July 3, 1948  9 Sheets-Sheet 3

INVENTOR.
JOHN B. WHITE
BY
Frederick Truesdale
ATTORNEY

May 29, 1951 J. B. WHITE 2,555,173
BALLAST SPREADER
Filed July 3, 1948 9 Sheets-Sheet 4

INVENTOR.
JOHN B. WHITE
BY
*Frederick Greenwood*
ATTORNEY

May 29, 1951 J. B. WHITE 2,555,173
BALLAST SPREADER
Filed July 3, 1948 9 Sheets-Sheet 5

INVENTOR.
JOHN B. WHITE
BY
Frederick Griswold
ATTORNEY

May 29, 1951 J. B. WHITE 2,555,173
BALLAST SPREADER
Filed July 3, 1948 9 Sheets-Sheet 6
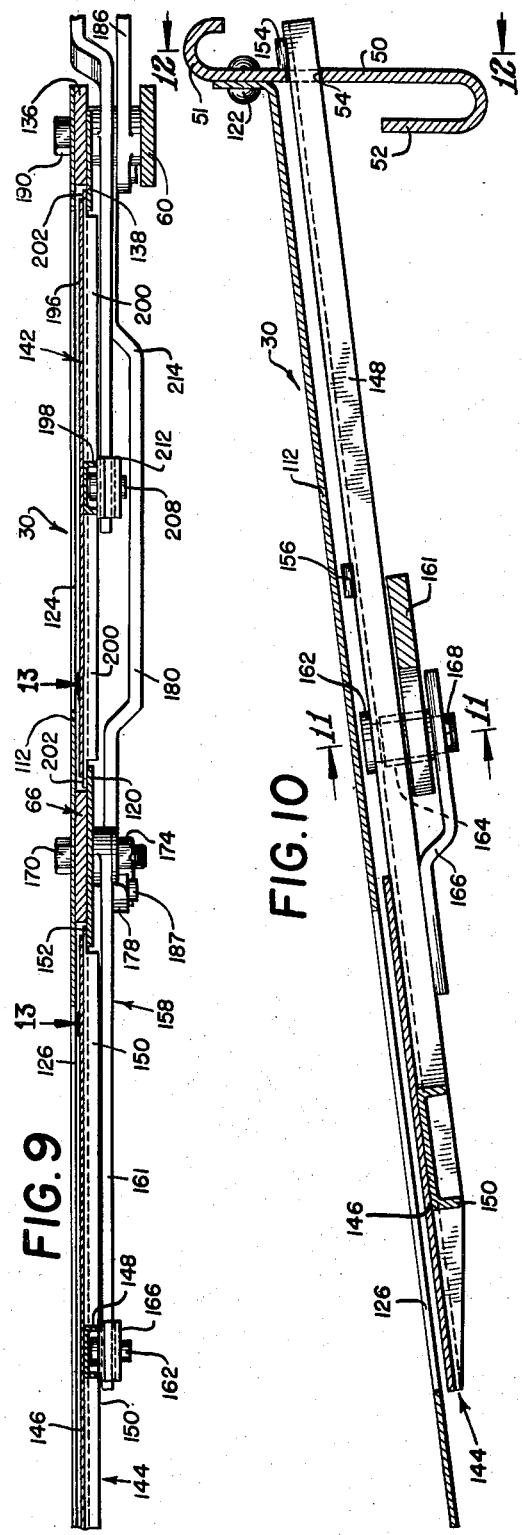
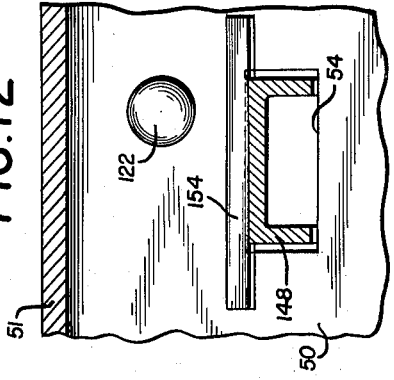
INVENTOR.
JOHN B. WHITE
BY Frederick Griswold
ATTORNEY May 29, 1951　　　　J. B. WHITE　　　　2,555,173
BALLAST SPREADER
Filed July 3, 1948　　　　　　　　　　　9 Sheets-Sheet 7
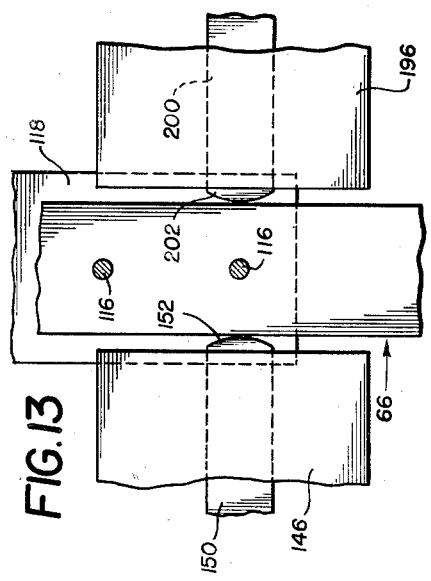
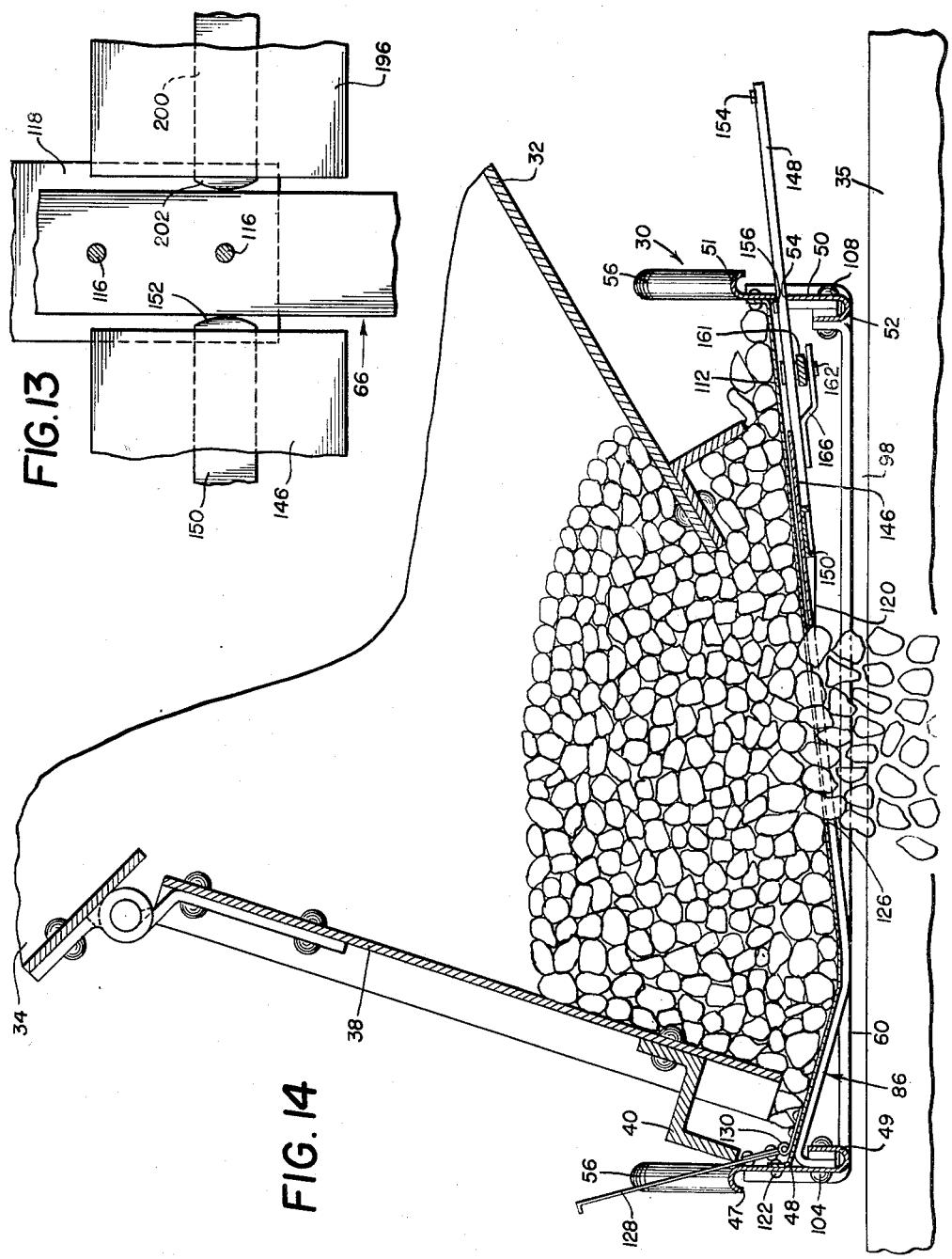
INVENTOR.
JOHN B. WHITE
BY
Frederick Griswold
ATTORNEY

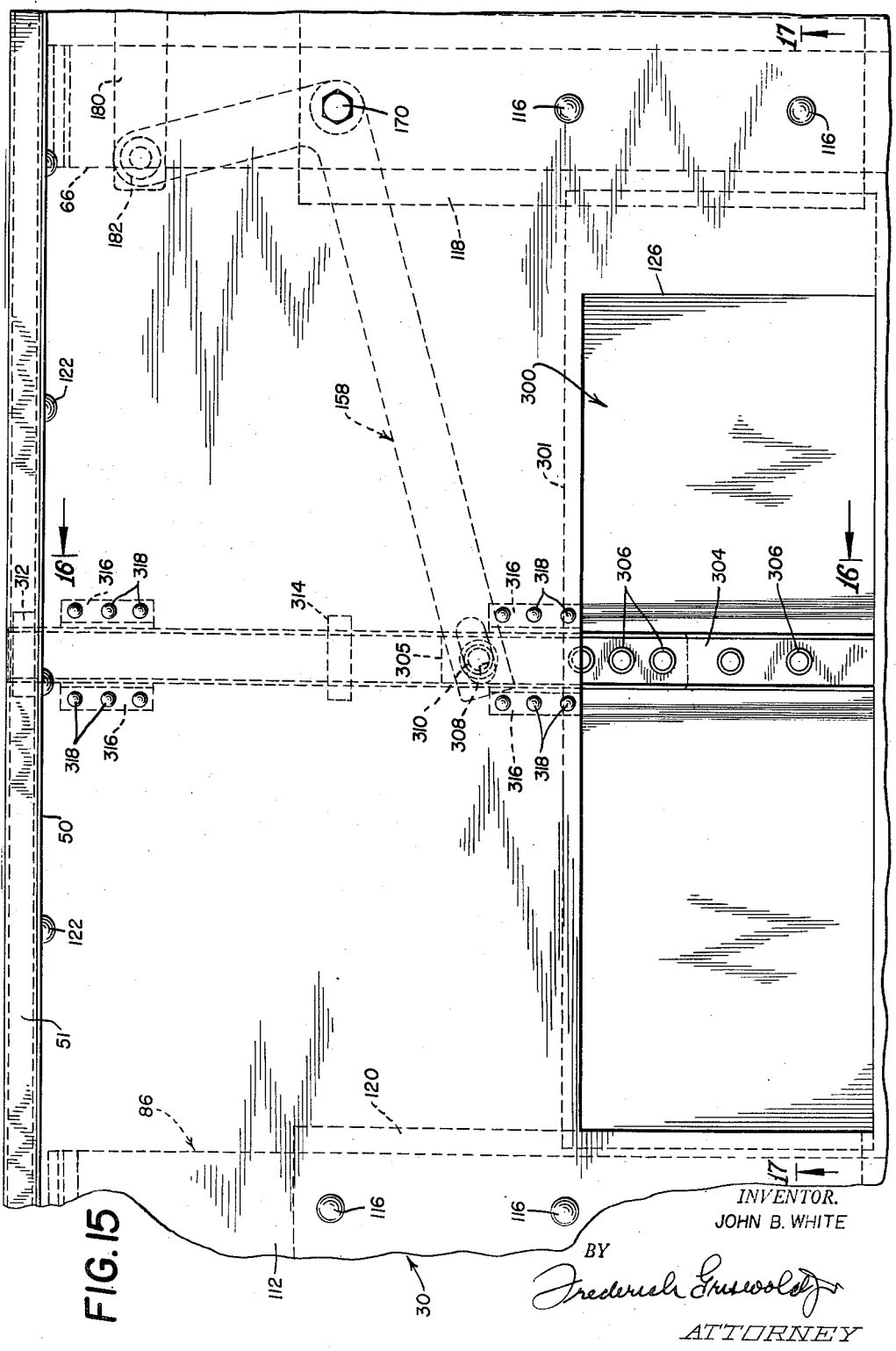

May 29, 1951

J. B. WHITE 2,555,173

BALLAST SPREADER

Filed July 3, 1948

INVENTOR.
JOHN B. WHITE
BY
Frederick Griswold
ATTORNEY

Patented May 29, 1951

2,555,173

UNITED STATES PATENT OFFICE 2,555,173

BALLAST SPREADER

John B. White, Tuckahoe, N. Y., assignor to Scientific Production Corporation, New York, N. Y., a corporation of New York Application July 3, 1948, Serial No. 36,913

6 Claims. (Cl. 105—239)

This invention relates to devices for receiving ballast from a railroad car and delivering it at will to any desired portion of the underlying track ballast cross-section of the track over which the car passes, said device being movable with the car and positioned in the path of ballast distribution.

Prior art ballast spreaders were provided with rollers adapted to contact with the tops of the track rails over which the car passes thereby facilitating movement of the spreader along the track and relieving its bottom from wear when, as is sometimes the case, it is necessary to position the spreader in contact with the rails in order to permit the lading discharge door of a particular car to be opened sufficiently to properly distribute the lading.

Ballast spreading devices have been provided with an auxiliary side plate or wall section which has been adapted to be positioned so as to prevent the undesired discharge of ballast to the road bed through the space between the inner ends of the door sections of a hopper car.

Heretofore, the bottom of the central portions of the spreader has been provided with an angularly movable door formed as a series of sections rigidly united to a common operating lever or bar, the ends of which are curved to facilitate the angular movement of the door. Lever means have also been provided to adjust the ballast spreading device so as to position it in proper operating relation to a lading discharge opening of the railway car with which the device is associated.

An improvement of ballast spreaders provided for the discharge of sufficient ballast into cribs so that the depth of the ballast extended from the subgrade to but a short distance below the upper surface of the cross ties. Much expense and labor have heretofore been expended in thus distributing ballast because it has been necessary to manually handle the ballast so as to insure its proper depth in the cross tie cribs. In this connection, it has been proposed to manually handle the ballast so as to insure its proper depth in the cross tie cribs. This has been accomplished by the provision of novel means for discharging ballast into the cross tie cribs thereby, said means being adapted for use in conjunction with a ballast spreading pan.

Again it has been proposed that the ballast be distributed at the required points and in the required amounts in the cross tie cribs, the dresser being automatic in operation.

Such a ballast dresser has been comprised of movably connected rigid elements which are moved along the lowermost elements to engage the tops of the cross ties and swing on either side of the car to engage the tops of the cross ties of the track.

Furthermore, in the distribution of ballast on a railroad, it has been the practice to require all of the ballast to be discharged when the hopper door is opened and the door cannot be closed or controlled during the time the ballast is being discharged so that the rate of discharge takes place at a uniform rate. However, since widely varying quantities of ballast are required at various points along the track, the ballast discharged from the car must be discharged subsequently and be moved from place to place by hand labor to form the proper ballast cross section.

This invention relates to an adjustably attached device for receiving ballast, such as broken stone, from a railway car and is adapted to distribute this ballast along the railway road bed.

When ballasting railway track it has been found to be a distinct advantage to supply the ballast material only where it is needed and in amounts sufficient to raise the level of the roadway the required amount without having the ballast overflow the cross-ties and rails and thus necessitate the use of hand labor to remove and properly distribute the excess ballast.

It is also desirable to control the amount and position of ballast dropped around switches, water troughs, crossings, etc.

In some instances ballast is needed only along one or both sides of a single rail, or the area between the rails may require considerable ballast adjacent one rail and little along the other rail.

It is economical and convenient to move ballast material in any standard hopper cars available. Certain of these cars are so constructed that when the hopper doors under the cars swing open they pass very close to the upper surface of the rails, therefore any device intended to fit under these doors must be of minimum thickness to allow full opening of the hopper doors.

Heretofore ballast spreaders have been used which have sliding doors loosely floating in guides, each door being operated by a lever and link. In actual use such a door tends to pivot about its link connection and jam cornerwise in the guiding surface. Under such conditions, control of the ballast flow becomes an uncertain factor. Occasionally, it was necessary to halt the work train to allow a man to go under the car to drive the sticking door loose.

Some other forms of ballast spreaders have employed a single closure device to cooperate with several apertures to control the dropping of ballast between the rails. These devices were operated by two men working in unison, one on each side of the hopper car. Obviously, a team work arrangement such as this is undesirable. Greater efficiency is obtained where each man may select and independently operate the spreader doors on his side of the road bed.

One object of this invention is to provide an improved ballast receiver and spreading device comprising a distributing pan provided with appropriate openings and attached to a frame that is braced in a novel manner to form a rigid structure that is comparatively light in weight and therefore easier to handle than former ballast spreaders.

Another object of the invention resides in providing an improved ballast spreader whereof the frame and distributing pan is shaped to accommodate necessary operating mechanism and yet have a minimum thickness in the area under the hopper doors of a railway car.

A further object of this invention is the provision of a ballast spreader having apertures arranged to be closed by sliding doors guided to move in a straight line without any possibility of jamming.

Still another object of the invention is to provide a ballast spreader in which the sliding doors are carried by the rigid frame work of the device so that deflections of the relatively thin distributing pan will not affect the operation of said doors.

These and other objects of the invention and the means for their attainment will be more apparent from the following detailed description taken in connection with the accompanying drawings illustrating one embodiment by which the invention may be realized and in which:

Figure 8 is a transverse sectional view taken in the plane indicated by the line 8—8 of Fig. 3 and illustrating the mounting of the operating levers.

Figure 9 is a transverse sectional view taken in the plane indicated by the line 9—9 of Fig. 4 and showing two of the sliding doors of the spreader.

Figure 10 is a detail view partly in section and partly in elevation and taken on the line 10—10 of Fig. 4 and showing the construction of one of the sliding doors.

Figure 11 is a view in transverse section taken in the plane indicated by the line 11—11 of Fig. 10 and illustrating a lever connection to a sliding door.

Figure 12 is a detail view partly in section taken along the line 12—12 of Fig. 10 and showing one of the door guiding means.

Figure 13 is an enlarged sectional plan view taken on a plane indicated by the line 13—13 of Fig. 9 and illustrating additional door guiding and supporting means.

Figure 14 is a view in cross section taken along the line 14—14 of Fig. 2 and showing the hopper car door and an intermediate spreader door open and ballast being dropped.

Figure 15 is an enlarged plan view of a portion of a ballast spreader pan and illustrating a modified form of sliding door construction.

Figure 1:
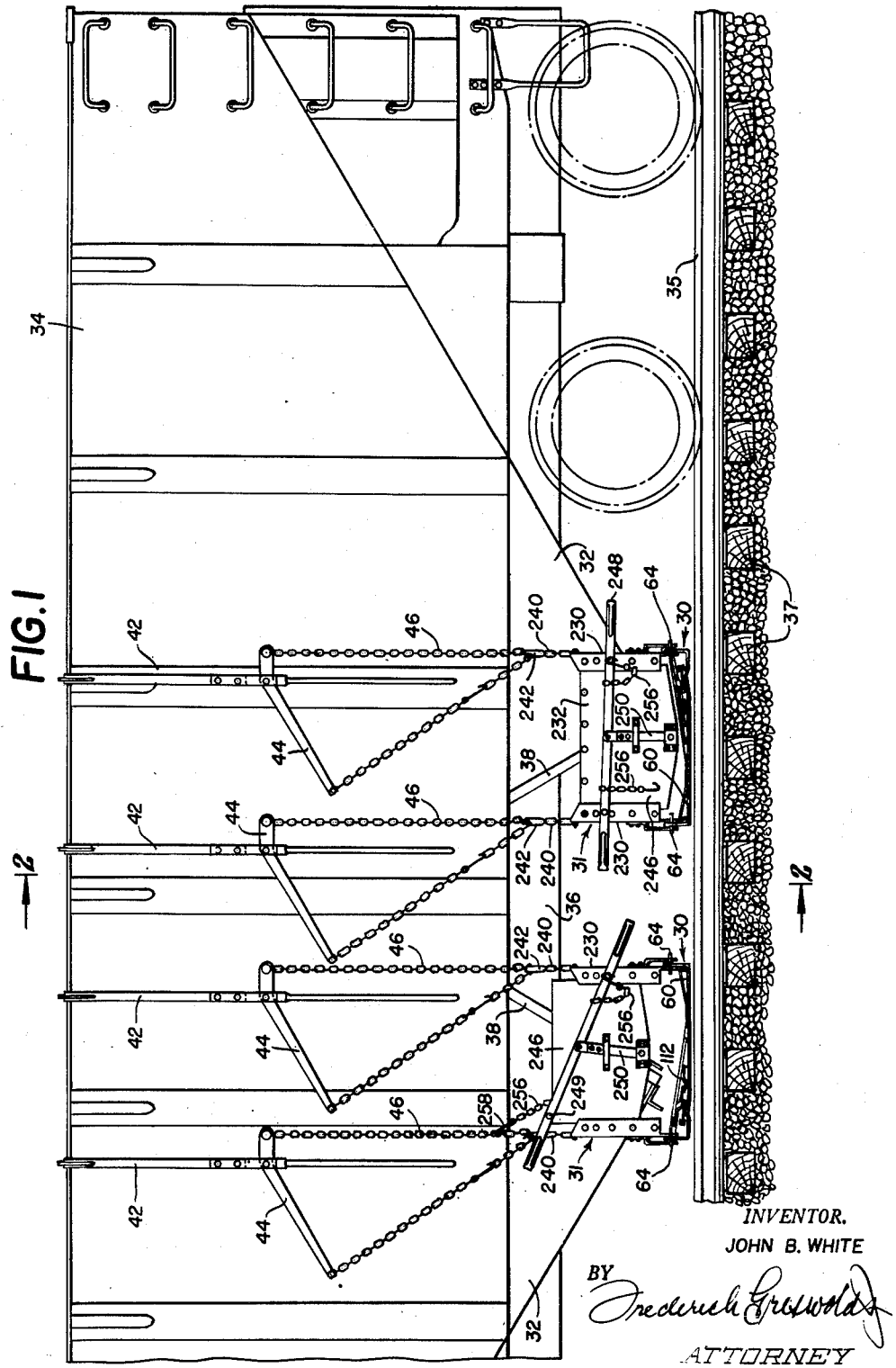
Figure 1 is a view in side elevation showing a portion of a hopper car with two ballast spreader devices hung in position to receive ballast from the car.
Figure 2:
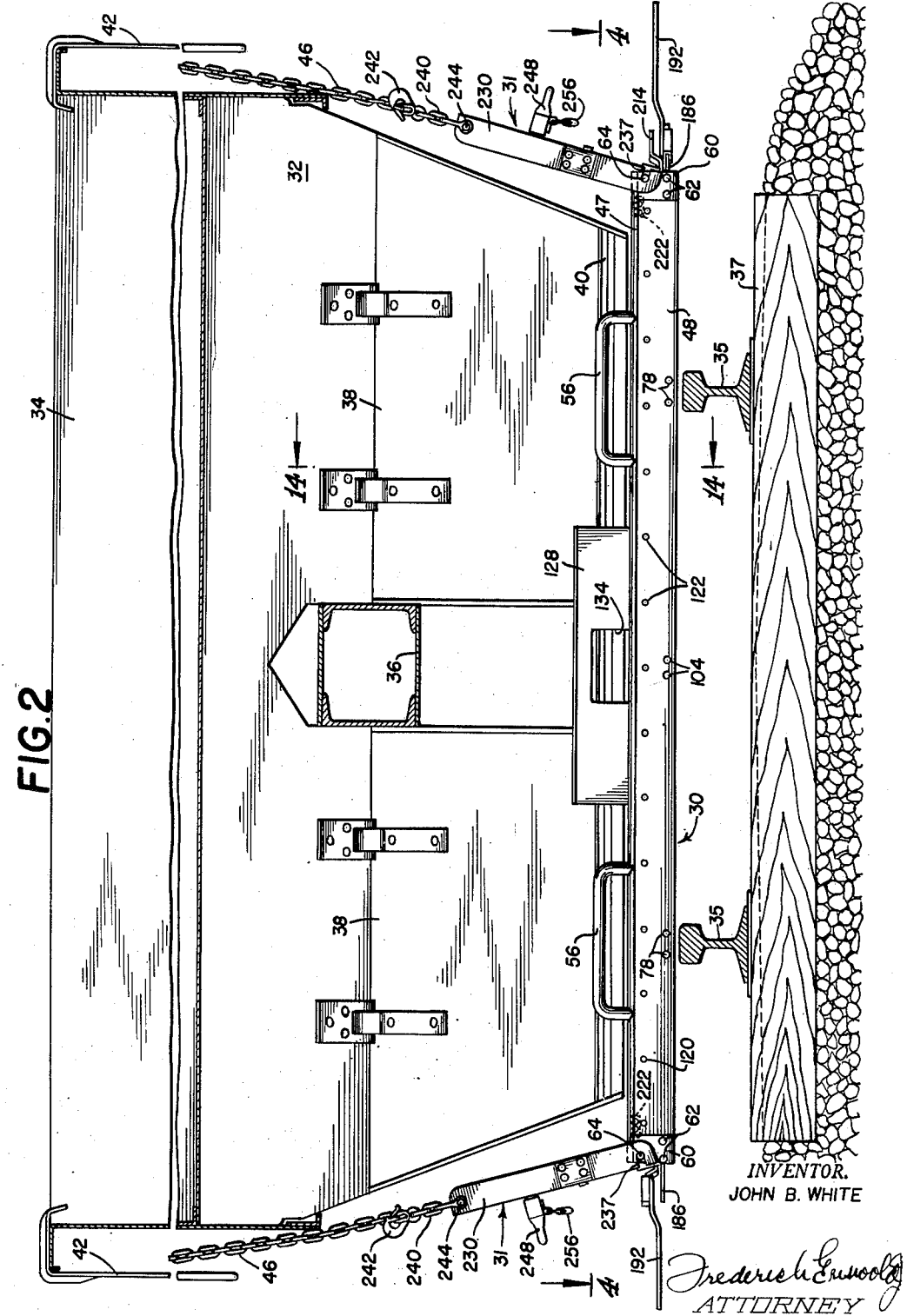
Figure 2 is a transverse vertical sectional view taken in the plane indicated by the line 2—2 of Fig. 1 and taken in the direction of the arrows.

Referring to the drawings in detail, wherein like parts are designated by like reference characters, the ballast spreader comprising a distributor pan member 30 and end wall members 31, is suspended beneath a discharge hopper 32 of a railway hopper car 34 on rails 35 carried on crossties 37 as shown in Figs. 1, 2 and 13. In the embodiment shown, the car is of the type in which the discharge openings are arranged in pairs, one on each side of the center sill 36 of the car, as sown in Fig. 2. The discharge openings are closed by doors 38 usually connected together by a tie bar 40.

The ballast spreader device 30 is hung from the top of the car 34 by hooked hangers 42, height adjusting levers 44 and chains 46.

The distributor pan 30 (Figs. 5 and 6) preferably consists of a pair of spaced parallel side frames 48 and 50. Side frame 48 has an upper flange 47 turned outwardly and downwardly and a lower flange 49 turned inwardly and then upwardly parallel with the frame 48. Side frame 50 also has an upper flange 51 that is turned outwardly and downwardly and a lower flange 52 turned inwardly and upwardly parallel with the frame 50. Side frame 50 is provided with openings 54, the purpose of which will be subsequently explained.

Lifting handles 56 are welded to the upper flanges 47 and 51 of the respective side frames 48 and 50. These handles also serve as sway stops and may abut against the car hoppers 32 or discharge door tie bar 40 to prevent the spreader from moving away from its position under the discharge opening of the car.

Figure 3:
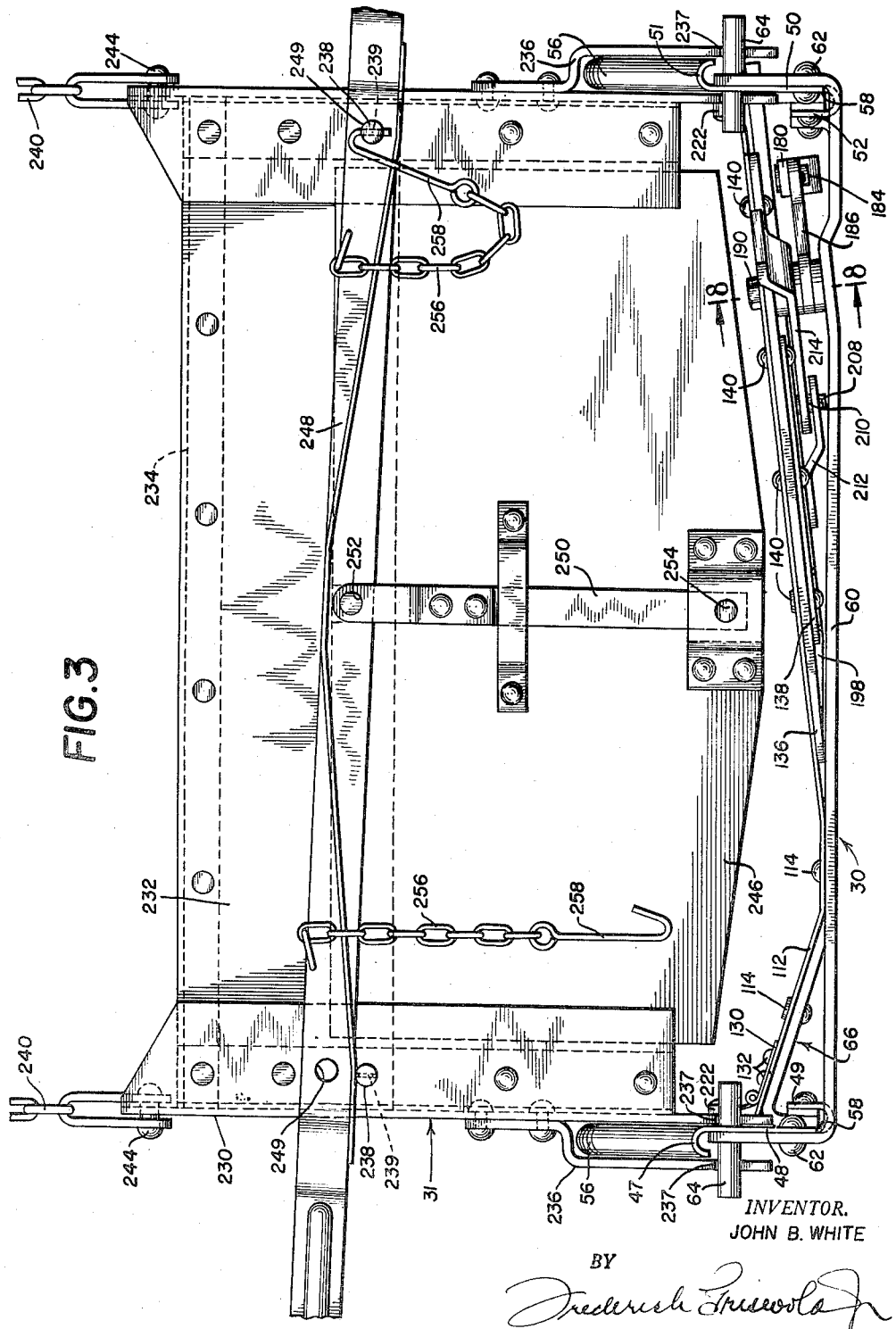
Figure 3 is a view in side elevation on an enlarged scale showing the end of the device as seen in Fig. 1.

Side frames 48 and 50 are cut out at their lower corners as indicated at 58 in Figure 3 to receive end braces 60 fastened to the side frames by rivets 62. The lower surface of the end braces are level with the bottoms of the side frames 48 and 50.

Figure 4:
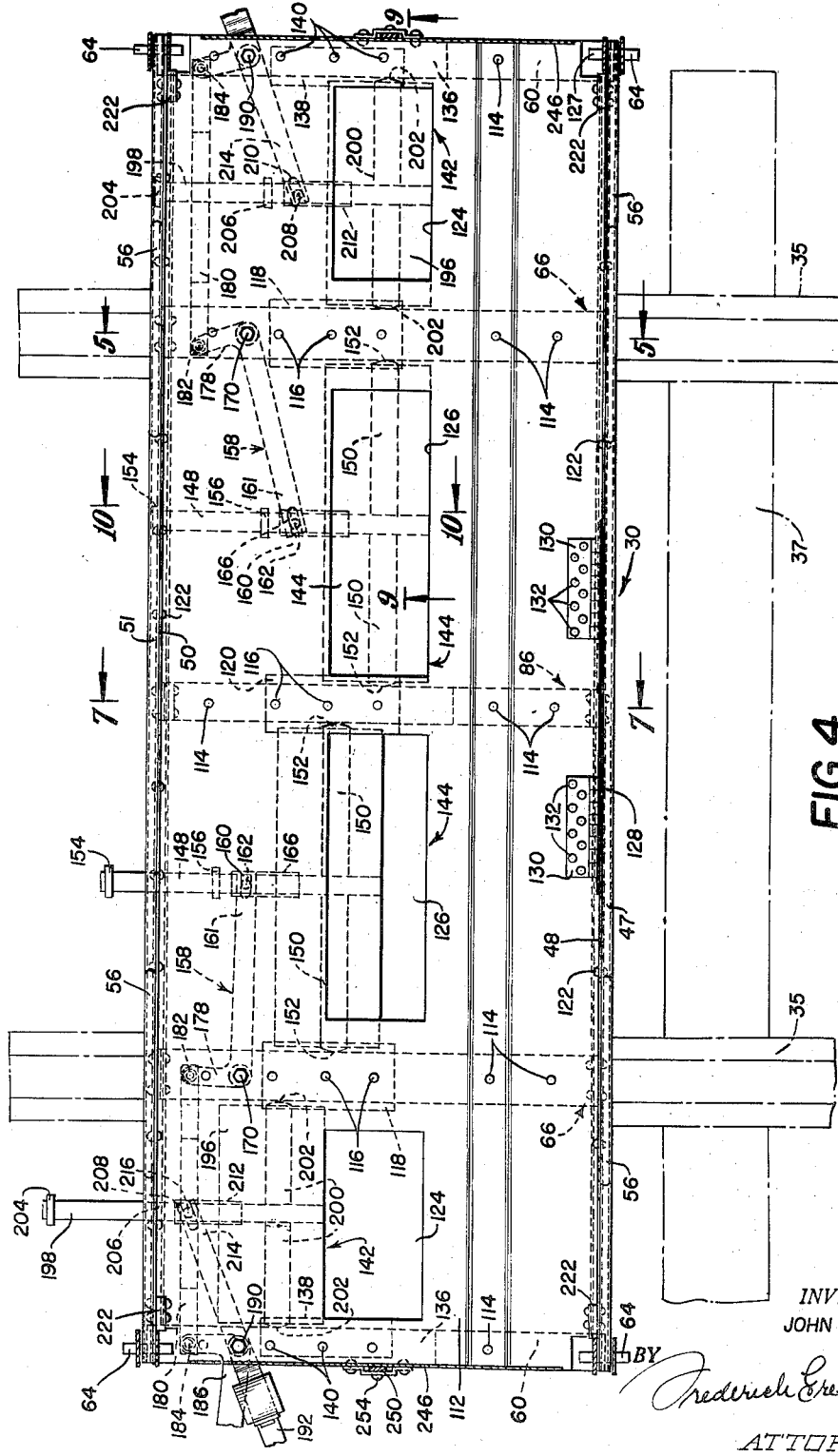
Figure 4 is a transverse plan sectional view taken in the plane indicated by the line 4—4 of Fig. 2 showing the distributor pan of the spreader.

A hanging pin 64 projecting through end braces 60 and the respective side frames 48 and 50 is provided at each corner of the ballast spreader as best shown in Fig. 4.

Figure 5:
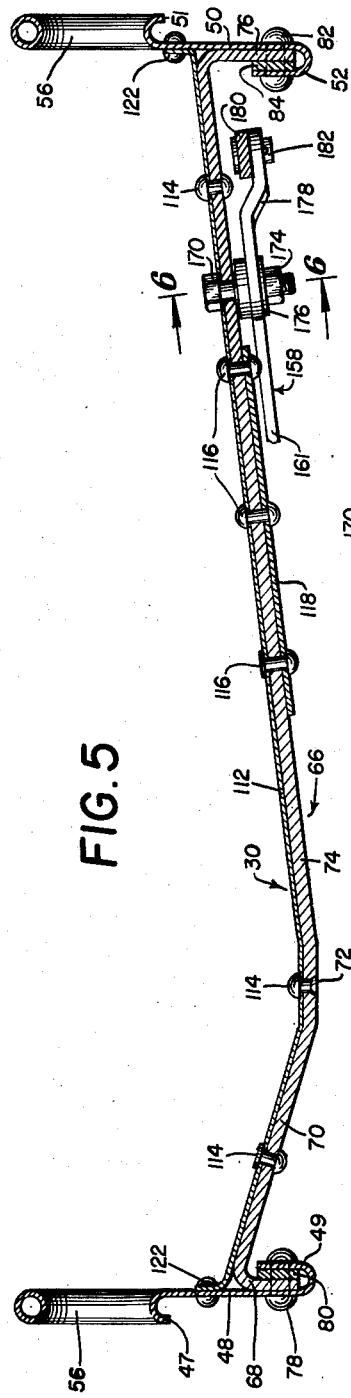
Figure 5 is a sectional view in transverse section taken in the plane indicated by the line 5—5 of Fig. 4 looking in the direction of the arrows, and showing an intermediate brace of the spreader.

Intermediate braces 66 are each formed with a vertical portion 68, a downwardly sloped portion 70 and a horizontal length 72, the lower surface of which is level with the bottoms of the side rails 48 and 50 whereby a minimum height of the pan above the track is obtained to allow the hopper door to swing open. Each brace then has an upwardly sloped portion 74 and then a downwardly extending vertical length 76 as shown in Fig. 5.

Each intermediate brace 66 is attached to side frame 48 by rivets 78 which extend through the side frame, vertical portion 68, spacer block 80 and flange 49. In a like manner each brace 66 is fastened to the side frame 50 by rivets 82 which pass through the side frame vertical portion 76, spacer block 84 and flange 52.

Figure 7:
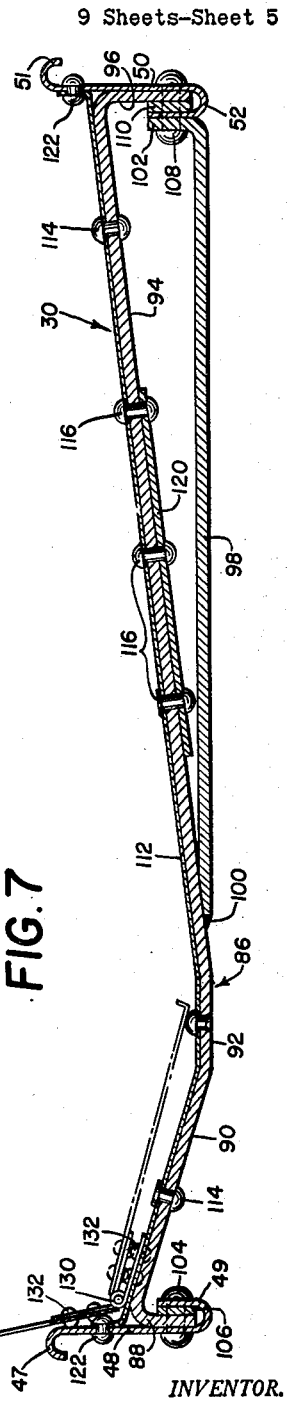
Figure 7 is a view in a cross section taken on the line 7—7 of Fig. 4 and showing the center brace 86 and associated parts of the spreader.

A center brace 86 is shaped with a vertical portion 88, a downwardly sloping section 90 and a horizontal length 92, the bottom surface being level with the lower surfaces of the side frames 48 and 50; the brace then has an upwardly sloping portion 94 and then a downwardly extending vertical length 96 as shown in Fig. 7. It will be noted here that the contour of the intermediate braces 66 and center brace 86 are identical thus far. A protective shoe 98 to assist the ballast spreader in clearing highway crossings, etc., is welded to center brace 86 at 100. Shoe 98 has an upwardly extending lip 102 that abuts flange 52.

Center brace 86 is fastened to side frame 48 by rivets 104 which pass through the side frame, vertical portion 88, spacer block 106 and flange 49. In a similar manner, brace 86 is made rigid with side frame 50 by rivets 108 which extend through the side frame, vertical portion 96, spacer block 110 and lip 102.

A distributor pan 112 shaped to conform to the upper contours of the braces 66 and 86 is attached thereto by short rivets 114 and longer rivets 116, the latter extending below the braces to fasten intermediate door support plates 118 and center door support plate 120 to the lower surfaces of the respective braces 66 and 86. The pan 112 is also made rigid with the side frames 48 and 50 by rivets 122.

The distributor pan 112 is cut out at its four corners as indicated at 127.

Rectangular apertures 124 are provided near the ends of the pan 112 to drop ballast along the outside areas of the rails 35. Intermediate openings 126 are cut nearer the center of the pan to supply ballast to the area between the rails 35 as shown in Fig. 4.

A baffle plate 128 to prevent ballast from overflowing the spreader is attached to the distributor pan 112 by means of a pair of hinges 130 and rivets 132. Baffle plate 128 may be swung downwardly into the pan as illustrated in Figure 7 to facilitate storage of the spreader. As some hopper cars are built with a bolt projecting from the tie bar 40, the baffle plate 128 is apertured at 134 to provide clearance for the bolt.

Reinforcing members 136 and door support plates 138 are fastened at each end of the pan 112 by rivets 140 as is most clearly shown in Figs. 3 and 4.

Sliding doors 142 are provided to control the flow of ballast through the apertures 124 while sliding doors 144 serve to control the supply through the openings 126. Doors 142 are adapted to be carried by door support plates 118 and 138 and doors 144 are arranged to slide on door support plates 118 and 120.

Each sliding door 144 consists of a flat closure plate 146 which has welded to its lower surface a channel shaped slide bar 148 that extends through an aperture 54 in the side frame 50, as best shown in Figs. 4, 10 and 12. A pair of channel shaped reinforcing members 150 are also welded to the bottom of the plate 146 with their inner ends butting against slide bar 148 and their outer ends extending beyond the ends of the closure plate 146. At the outer side of the members 150, the flanges of the channels are cut off an appropriate distance as shown in Fig. 9, leaving the webs 152 to extend over their respective door support plates 118 and 120. The webs 152 are formed with a radius at their ends so that nothing more than a point contact is made between each web 152 and its guiding surface along the sides of intermediate brace 66 or center brace 86 as is most clearly shown in Fig. 4.

A stop block 154 is carried on slide bar 148 to stop the door in its closed position by striking the outer face of side frame 50. A similar stop block 156 is positioned on slide bar 148 to strike the inner face of side frame 50 when the door is fully opened.

An operating bell crank lever 158 having an elongated opening 160 in its longer arm 161 is connected to the door assembly 144 by a pin 162 that is carried in the slide bar 148. Pin 162 is provided with a loosely fitted combined spacing sleeve and roller 164, and is supported at its lower end by a yoke 166 welded to the slide bar as shown in Figs. 10 and 11. A cotter pin 168 prevents accidental removal of the pin.

It will be understood from the foregoing description that the door 144 is guided in its sliding motion by the sides of braces 66 and 86 and by the sides of the aperture 54 in the side frame 50 and therefore it is required to move in a straight line without the possibility of turning cornerwise and thus jam in the guides.

Figure 6:
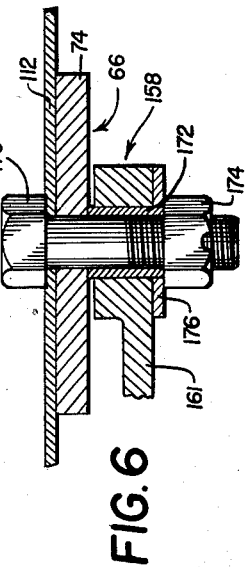
Figure 6 is an enlarged transverse sectional view taken in the plane indicated by the line 6—6 of Fig. 5 and showing in detail the mounting of a lever to operate an intermediate door.

Each bell crank lever 158 is fulcrumed on a bolt 170 that passes through the pan 112 and intermediate brace 66. A sleeve 172 is fitted on the bolt 170 to provide spaced relationship between a nut 174 and brace 66. A washer 176 is used to provide a bearing surface for lever 158 as illustrated in Fig. 6.

Each bell crank lever 158 has a shorter arm 178, connected to one end of a link 180 by a pin 182. The other end of link 180 is connected by a pin 184 to a bell crank lever 186 pivoted on a bolt 190 as is most clearly shown in Fig. 4.

As illustrated at the right hand side of Fig. 2, a removable extension handle 192 may be slipped over the exposed end of bell crank lever 186 by an operator as he walks beside the ballast spreading device and he may then, by rotating the lever 186, move the sliding door 144 to regulate the flow of ballast through the aperture 126. Similarly, another operator on the opposite side of the track may control the ballasting through the adjacent opening 126.

Sliding doors 142 are preferably constructed in a similar fashion to the doors 144, previously described. Each door 142 has a closure plate 196 and a slide bar 198 which passes through an aperture 54 in side frame 50. Also channel reinforcing members 200 with projecting web portions 202, are curved at the ends and rest on door support plates 118 and 138 as shown in Figs. 4 and 9. Stop blocks 204 and 206 limit movement of the door. Each door is also provided with a pin 208 having a sleeve 210 and a yoke 212 to receive an operating lever 214 that is pivoted on the bolt 190. The inner end of the lever 214 has an elongated hole 216 to engage the pin 204 and sleeve 206. The outer end of either lever 214 may be engaged by the extension handle 192 to open or close the respective doors 142.

Each bolt 190 passes through pan 112, reinforcing member 136, levers 214 and 186 and is threaded into an end brace 60 as shown in Fig. 8. A sleeve 218 is provided on the bolt 190 to maintain the member 136 and brace 60 in spaced relationship to prevent binding on the levers 186 and 214 which are separated by a washer 220.

Blocks 222 are riveted near each corner of the distributing pan 30 as shown in Fig. 4 to prevent accidental removal of the unit from the end wall members 31.

As is best shown in Figs. 1, 2 and 3, each end wall member 31 comprises a pair of angular corner posts 230 spaced in parallel relationshp by a plate 232. Further rigidity is added to the structure by an angle brace 234. Yokes 236 are riveted to the corner posts 230 and the yokes and posts are provided with open slots 237 to engage pins 64. Each corner post carries a projecting pin 238 drilled with a transverse hole 239.

Short lengths of chain 240 having hooks 242 are attached by rivets 244 to the upper ends of the corner posts 230.

Each end wall member 31 is fitted with a door 246 arranged to slide vertically and when open allows ballast material to spill over the end of the distributor pan 30 to ballast the area of the road bed beyond the ends of the cross-ties 37. Lever 248 arranged to be fulcrumed on either one of the pins 238 by means of holes 249, is operatively connected to the door by a link 250 pivotally connected at 252 to the lever and pivoted to the door at 254. Lever 248 carries two chains 256 each furnished with a long hook 258 at its end. The lever is retained on either pin 238 by dropping the appropriate hook 258 into the hole 239 of the pin.

The door 246 may be held open by the attending operator or he may, for convenience, insert the free hook 258 into a suspending chain 46 to retain the door in the open position as illustrated at the left hand side of Fig. 1.

When setting up the ballast spreader under a railway car the usual procedure is to place the hangers 42 and chains 46 on the car and set the distributor pan 30 on the rails 35 directly below the discharge opening of a hopper 32. Each end wall member 31 is then installed by holding the member parallel with the pan unit and dropping the slots 237 over pins 64 after which the end walls are swung up to a nearly vertical position and attached to the chains 46 by hooks 242. The spreader device may then be raised the desired distance above the rails by means of the chain adjusting levers 44.

Figure 16:
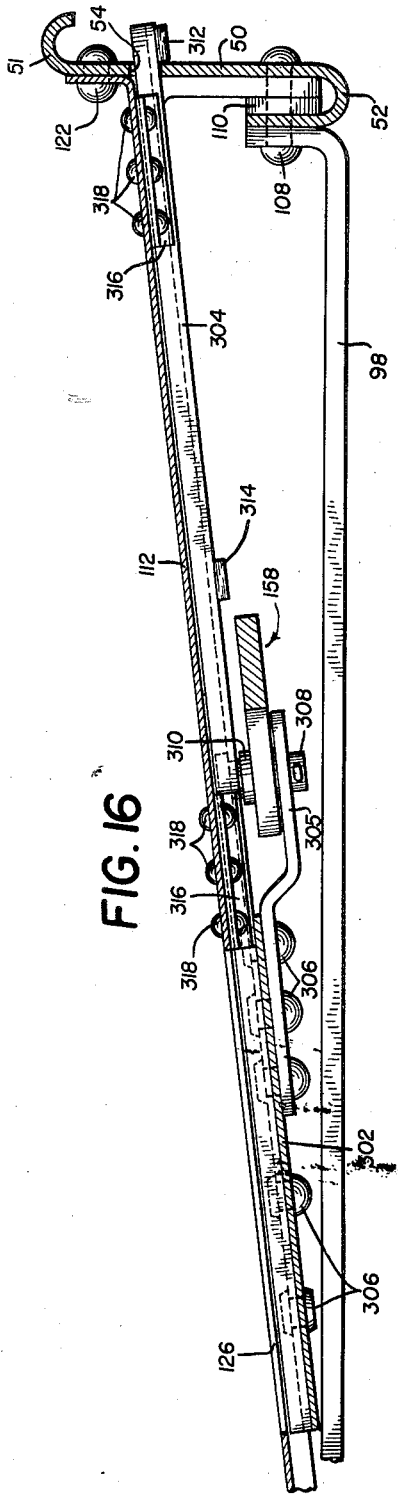
Figure 16 is a detail view partly in section taken along the line 16—16 of Fig. 15.
Figure 17:
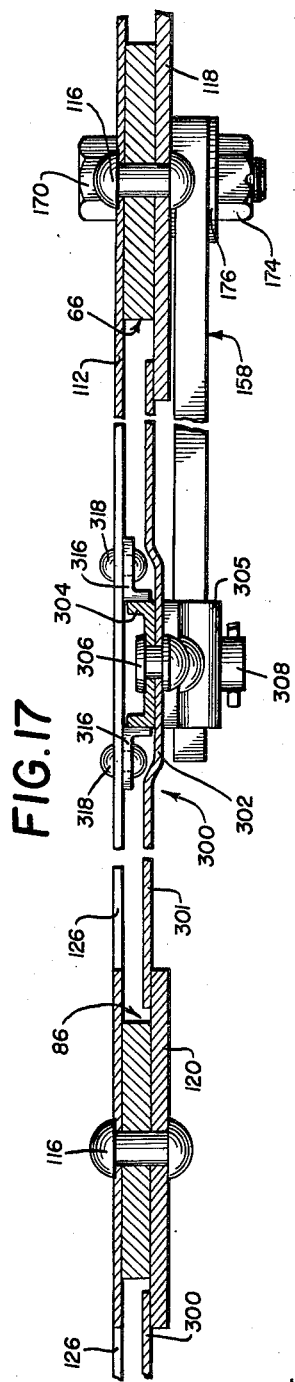
Figure 17 is a transverse sectional view taken along the line 17—17 of Fig. 15.

A modified construction of a sliding door is shown in Figs. 15, 16 and 17, wherein an intermediate door is illustrated to close an aperture 125 in the pan 112. It will be understood, however, that this same method may be applied to the outer door openings 124. The door 300 in this instance comprises a closure plate 301 having a depressed portion 302. A channel shaped slide bar 304 and a yoke 305 are fastened to the depressed area 302 of the closure plate by rivets 306, the opposite end of the slide projecting through an aperture 54 in the side frame 50. A pin 308 having a sleeve 310 is carried on the bar 304 to engage the bell crank lever 158 pivoted on the bolt 170. Stop blocks 312 and 314 are provided on the slide bar to limit movement of the door.

Guides 316, preferably in the form of angles, are fastened to the pan 112 by rivets 318.

It will be observed in Fig. 17 that door 300 is carried on door support plates 118 and 120 and that the guides 316 are not depended upon for support. However, the guides 316, acting on slide bar 304, do prevent the edges of the closure plate 301 from coming into contact with the sides of braces 66 and 86 and therefore jamming cannot occur.

Various modifications will occur to those skilled in the art in the form taken by the ballast delivery instrumentalities as well as the coacting parts supporting and actuating the instrumentalities, the structure which avoids swaying, and the disposition of the associated structural elements, and no limitation is intended by the phraseology of the foregoing description or illustrations in the accompanying drawings, except as indicated in the annexed claims.

What is claimed is:

1. In a ballast spreader, in combination, a ballast receiving pan formed with a ballast delivery opening, a closure for said opening, a reenforcing strip attached to the lower side of said closure, said strip being longer than the closure is wide, and extending beyond the closure on two sides, said strip formed with curved ends, strengthening braces positioned transversely of the pan, support plates attached to the braces and extending therebeyond presenting a ledge for receiving the ends of said strip whereby the curved ends of the strip make contact with the braces whereby cocked door jamming is prevented.

2. In a ballast spreader, in combination, a ballast receiving pan formed with a ballast delivery opening, a closure for said opening, a reenforcing strip attached to the lower side of said closure, said strip being longer than the closure is wide and extending beyond the closure on two sides, said strip formed with curved ends, strengthening braces positioned transversely of the pan, support plates attached to the braces and extending therebeyond presenting a ledge for receiving the ends of said strip, a side member attached to said pan, said side member formed with an aperture, a guide bar attached to said closure and extending through said aperture whereby the closure is guided in a straight line movement and whereby the curved ends of the strip make contact with the braces whereby cocked door jamming is prevented.

3. In a ballast spreader, in combination, a ballast receiving pan formed with a ballast delivery opening, a closure for said opening, a reenforcing strip attached to the lower side of said closure, said strip being longer than the closure is wide and extending beyond the closure on two sides, said strip formed with curved ends, strengthening braces positioned transversely of the pan, support plates attached to the braces and extending therebeyond presenting a ledge for receiving the ends of said strips, a side member attached to said pan, said side member formed with an aperture, a guide bar attached to said closure and extending through said aperture whereby the closure is guided in a straight line movement, an operating lever connected to said guide bar and means for operating said lever whereby the closure is positioned to cover or uncover the delivery opening and whereby the curved ends of the strip make contact with the braces whereby cocked door jamming is prevented.

4. In a ballast spreader, in combination, a ballast receiving pan and means for delivering ballast therefrom including manually operable means, said pan adapted to be positioned beneath a ballast carrying railway car and just above the level of the rails upon which the ballast carrying car runs, said pan supporting the ballast delivering operating means thereunder and a shield positioned under the ballast delivery operating means for contact with any highway crossing planks encountered in the progress of the ballast carrying car under which the pan is positioned whereby the operating means are protected.

5. In a ballast spreader, in combination, a ballast receiving pan formed with a ballast delivery opening and a closure therefor and means for operating the closure to cover or uncover the opening, a baffle plate, hinges attaching the baffle plate to the pan whereby the baffle plate may be caused to lie parallel to the pan or at about a right angle thereto, a side member extending upwardly from the edge of the pan against which the baffle plate bears when at a right angle to the pan, said baffle plate positioned when at a right angle to the pan to prevent ballast being delivered to the pan from a hopper car formed with two delivery doors one on each side of a central longitudinal center sill from flowing directly to the ground adjacent the pan.

6. In a ballast spreader, in combination a pan for receiving ballast from a ballast delivery car, said pan adapted to be positioned beneath the car, transversely thereof closely adjacent rails upon which the car runs, said pan formed longitudinally of the car and rails with a lowest portion intermediate the sides thereof, and a higher portion at one side and a still higher portion at the other side, said pan formed with delivery openings and closures therefor, and means positioned under the still higher portion for operating the closures, whereby the volume of ballast receivable approaches a maximum and the operating means are elevated above the ballast receiving ground higher than the lowest portion of the pan.

JOHN B. WHITE.

REFERENCES CITED

The following references are of record in the file of this patent:

UNITED STATES PATENTS

| Number | Name | Date |
|---|---|---|
| Re. 9,533 | Earl | Jan. 11, 1881 |
| 731,676 | Gibbs et al. | June 23, 1903 |
| 1,535,987 | Clas | Apr. 28, 1925 |
| 1,662,926 | Kerns | Mar. 20, 1928 |
| 1,667,085 | Straw | Apr. 24, 1928 |
| 1,689,694 | Straw | Oct. 30, 1928 |
| 1,689,806 | Straw | Oct. 30, 1928 |